US006973650B1

(12) United States Patent
Parkes et al.

(10) Patent No.: US 6,973,650 B1
(45) Date of Patent: Dec. 6, 2005

(54) METHOD OF PIPELINED PROCESSING OF PROGRAM DATA

(75) Inventors: Michael A. B. Parkes, Redmond, WA (US); Frederic O. Vicik, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/436,618

(22) Filed: Nov. 9, 1999

(51) Int. Cl.[7] .......................... G06F 9/46; G06F 12/00
(52) U.S. Cl. ....................... 718/100; 718/106; 711/118
(58) Field of Search ............................... 709/100, 102, 709/106–108, 201; 711/2, 118, 126; 712/28, 712/30, 31; 710/22; 707/100; 718/100, 102, 718/106–108

(56) References Cited

U.S. PATENT DOCUMENTS

| 5,452,447 | A | * | 9/1995 | Nelson et al. ............... 707/205 |
| 5,485,609 | A | * | 1/1996 | Vitter et al. ................. 707/101 |
| 5,517,662 | A | | 5/1996 | Coleman et al. |
| 5,524,242 | A | | 6/1996 | Aida et al. |
| 5,553,305 | A | * | 9/1996 | Gregor et al. ............... 709/106 |
| 5,566,321 | A | | 10/1996 | Pase et al. |
| 5,768,515 | A | | 6/1998 | Choquier et al. |
| 5,828,880 | A | * | 10/1998 | Hanko ......................... 709/106 |
| 6,003,066 | A | * | 12/1999 | Ryan et al. .................. 709/201 |
| 6,088,044 | A | * | 7/2000 | Kwok et al. ................. 345/505 |
| 6,119,145 | A | * | 9/2000 | Ikeda et al. .................. 709/203 |
| 6,230,190 | B1 | | 5/2001 | Edmonds et al. |
| 6,266,708 | B1 | * | 7/2001 | Austvold et al. ........... 709/315 |
| 6,298,382 | B1 | * | 10/2001 | Doi et al. .................... 709/229 |
| 6,330,583 | B1 | | 12/2001 | Reiffin |
| 6,330,643 | B1 | * | 12/2001 | Arimilli et al. ............. 711/141 |
| 6,425,021 | B1 | * | 7/2002 | Ghodrat et al. .............. 710/22 |
| 6,496,871 | B1 | | 12/2002 | Jagannathan et al. |
| 6,505,229 | B1 | * | 1/2003 | Turner et al. ............... 709/107 |
| 6,633,897 | B1 | * | 10/2003 | Browning et al. .......... 708/103 |

OTHER PUBLICATIONS

Gosling, James, et al., "The Java Language Specification," *Addison Wesley*, (1996).

Ailamaki, Anastassia G., et al., "DBMSs On A Modern Processor: Where Does Time Go?," in the Proceedings of the 25th International Conference on Very Large Data Bases, (Sep. 1999), pp. 266-277, Edinburgh, Scotland UK.

Nikhil, Arvind and Rishiyur S., "I-Structure: Data Structures for Parallel Computing," *ACM Transactions on Programming Languages and Systems*, vol. 11(4):598-632, (Oct. 1989).

(Continued)

*Primary Examiner*—Meng-Al T. An
*Assistant Examiner*—Syed J Ali
(74) *Attorney, Agent, or Firm*—Microsoft Corporation

(57) ABSTRACT

A system for pipelined processing of program data uses a series of servers. A server is an event loop optimized for performing a particular task in the overall program. Servers perform their respective tasks in response to receiving work packets. A work packet is a data structure containing the data needed to perform that task. Each server has a queue of pending work packets. When there are work packets in a server's queue, the server performs the required function using the user context data contained in the packet, and may generate a reply code when complete. A server may run on a single CPU until all work packets in its queue have been processed, or it may also be shared among two or more CPUs. Each server performs its designated task for all users and thus, the general effect of this method is that each CPU performs a single task for all users, thereby insuring that the global context state for each task tends to remain in the cache of the CPU performing that task.

39 Claims, 11 Drawing Sheets

OTHER PUBLICATIONS

Banga, Gaurav, et al., "Scalable Kernel Performance for Internet Servers Under Realistic Loads," in the *Proceedings of the USENIX 1998 Annual Technical Conferenc*; New Orleans, LO, (Jun. 1998), pp. 1-12.

Blelloch, Guy E., et al., "Space-Efficient Scheduling of Parallelism with Synchronization Var8ables," in *Proceedings of the 9th annual ACM Symposium on Parallel algorithms and Architectures (SPAA)*; Newport, Rhode Island, (1997), pp. 12-23.

Cao, q., et al., "Detailed Characterization of a Quad Pentium Pro Server Running TPC-D," in *Proceedings of the International Conference on Computer Design (ICCD)*; Austin, TX, (Oct. 1999), pp. 108-115.

Chilimbi, Trishul, M., et al., "Cache-Conscious Structure Definition," in the *Proceedings of the ACM SIGPLAN '99 Conference on Programming Language Design and Implementation (PLDI)*; Atlanta, GA, (May 1999), , pp. 13-24.

Chilimbi, Trishul, M., et al., "Cache-Conscious Structure Layout," in the *Proceedings of ACM SIGPLAN '99 Conference on Programming Languages Design and Implementation (PLD)*; Atlanta, GA, (May 1999), pp-. 12,.

Eickemeyer, Richard, J., et al., "Evaluation of Multithreaded Uniprocessors for Commercial Application Environments," in *Proceedings of the 23rd Annual International Symposium on Computer Architecture*; Philadelphia, PA, (May 1996), pp. 203-212,.

Freeh, Vincent, W., et al., "Distributed Filaments: Efficient Fine-Grain Parallelism on a Cluster Of Workstation," in *Proceedings of the First USENIX Symposium on Operating Systems Design and Implementation (OSDI)*; Monterey, CA, (Nov. 1994), pp. 201-213.

Harel, D., et al., "On the Development of Reactive Systems, " in *Logics and Models of Concurrent Systems*, vol. F13, K.R. Apt, Ed. Berlin: Springer-Verlag (1985), pp. 477-498.

Jayasimha, Jay, et al., "Thread-based Cache Analysis of a Modified TPC-C Workload," *in Proceedings of the Second Workshop on Computer Architecture Evaluation Using Commercial Workload*; Orlando, FL. (1999).

Keeton, Kimberly, et al., "Performance Characterization of a Quad Pentium Pro SMP Using OLTP Workloads," in *Proceedings th e25th Annual International Symposium on Computer Architecture*; Barcelona, Spain, vol. 26(3):15-26, (Jun. 1998).

Lamarca, Anthony, et al., "The Influence of Caches on the Performance of Heaps," *The ACM Journal of Experimental Algorithmics*, (1997), pp. 1-32.

Lo, Jack, L., et al., "An Analysis of Database Workload Performance on Simultaneous Multithreaded Processors," in *Proceedings of the 25th Annual International Symposium on Computer Architecture*, Barcelona, Spain, vol. 26(3):39-50, (Jun. 1998).

Maltzahn, Carlos, et al., "Performance Issues of Enterprise Level Web Proxies," in Proceedings of the *1997 ACM Sigmetrics International Conference on Measurement and Modeling of Computer Systems*; Seattle, WA, (Jun. 1997), pp. 13-23.

Morris, Robert, et al., "The Click Modular Router," in *Proceedings of the 17th ACM Symposium on Operating Systems Principles (SOSP '99)*; Charleston, South Carolina, vol. 33(5):217-231 (Dec. 1999).

Pai, Vivek, S., et al., "Flash: An efficient and portable Web Server," in *Proceedings of the 1999 USENIX Annual Technical Conference*; Monterey, CA, (Jun. 1999), pp. 199-212.

Pettis, Karl, et al., "Profile Guided Code Positioning," in *Proceedings of the ACM SIGPLAN '90 Conference on Programming Language Design and Implementation*; White Plans, NY., (Jun. 1990), *SIGPLAN Notices*, vol. 35(6):16-27.

Philbin, James, et al., "Thread Scheduling for Cache Locality," in *Proceedings of the 7th International Conference on Architectural Support for Programming Languages and Operating systems (ASPLOS VII)*; Cambridge, MA, (Oct. 1996), pp. 60-71.

Ranganathan, Parthasarathy, et al., "Performance of Database Workloads on Shared-Memory Systems with Out-of-Order Performance," in the *Proceedings of the 8th International Conference on Architectural Support for Programming Languages and Operating Systems (ASPLOS VII)*; San Jose, CA., (Oct. 1998), pp. 307-318.

Torrellas, Josep, et al., "Optimizing the Instruction Cache Performance of the Operating System," *IEEE Transactions on Computers*. vol. 47(12):1363-1381, (Dec. 1998).

Wand, Mitchell, "Continuation-Based Multiprocessing," in *Proceedings of the 1980 LISP Conference*; Stanford University, Palo Alto, CA, (Aug. 1980), pp. 19-28.

Hill, Mark, D., et al., "Evaluating Associativity in CPU Caches," *IEEE Transactions on Computers*; vol. 38(12): 1612-1630, (1989).

Lee, Edward, A., et al., "Dataflow Process Network," *Proceedings of the IEEE*; vol. 83(5):773-799, (May 1995).

Mogul, Jeffrey, C., et al., "The Effect of Context Switches on Cache Performance," in Proceedings of the Fourth International Conference on Architectural Support for Programming Languages and Operation Systems, Santa Clara, CA, (apr. 1991), pp. 75-85.

Najjar, Walid A., et al., "Advances in the dataflow computational Model," Parallel Computing, vol. 25, (1999).

Perl, Sharon, et al., "Studies of Windows NT Performance Using Dynamic Execution Traces," in *Proceedings of the 2nd USENIX Symposium on Operating Systems Design and Implementation (OSDI)*; vol. 30, Special Issue (1996), Seattle, WA. (Oct. 1997).

Rosenblum, Mendel, et al., "The Impact of Architectural Trends on Operating System Performance," *Copper Mountain Resort*, CO., (Dec. 1995), pp. 285-298.

Acar, Umut, A., et al., "The Data Locality of Work Stealing," in *Proceedings of the Twelfth Annual ACM Symposium on Parallel Algorithms and Architectures (SPAA 2000)*; Bar Harbor, ME., (Jul. 2000).

Anderson, Thomas E., "The Performance of Spin Lock Alternatives for Shared-Memory Multiprocessors," *IEEE Transaction on Parallel And Distributed Systems*, vol. 1(1): 6-16, (1990).

Banga, Gauravc, et al., "Better Operating System Features for Faster Network Servers," in the *Proceedings of the Workshop on Internet Server Performance*; Madison, WI Jun. 1998.

Barroso, Luiz, Andre, et al., "Memory System Characterization of Commercial Workloads," in *Proceedings of The 25th Annual International Symposium on Computer Architecture*; Barcelona, Spain, (Jun. 27-jul. 1, 1998), pp. 3-14.

Blackwell, Trevor, "Speeding up Protocols for Small Messages," in *Proceedings of ACM SIGCOMM '96 Conference on Applications, Technologies, Architectures, and Protocols for Computer Communications*; Palo Alto, CA, (Aug. 1996), pp. 85-95.

Blumofe, Robert D., et al., "Cilk: An Efficient Multithreaded Runtime System," *Journal of Parallel and Distributed Computing*, vol. 37(1):55-69, (1996).

Chankhunthod, Anawat, et al., "A Hierarachical Internet Object Cache," in *Proceedings of the USENIX 1996 Annual Technical Conference*: San Diego, CA., (Jan. 1996), pp. 153-163.

Draves, Richard, P., et al., "Using Continuations to Implement Thread Management and Communication in Operating Systems," in *Proceedings of the Thirteenth ACM Symposium on Operating Systems Principles*; Pacific Grove, CA., (Oct. 1991), pp. 122-136.

Perl, Sharon, E., et al., "Studies of Windows NT Performance Using Dynamic Execution Traces," in *Proceedings of the Second Symposium on Operating Systems Design and Implementation (OSDI '96)*; Seattle, WA, (oct. 1996), pp. 169-183.

Chandra, Sandra, et al., "Teapot: A Domain-Specific Language for Writing Cache Coherence Protocols," *IEEE Transactions on Software Engineering*; vol. 25(3):pp317-333, (1999).

Chen, J. Bradley, "Memory Behavior of an X11 Window System," in the *Proceedings of the Winter 1994 USENIX Conference*; San Francisco, CA, (Jan. 1994), pp. 189-200.

Papadimitriou, Christos, "The Theory of Database Concurrency Control," Rockville, MD., Computer Science Press, (1986) pp. 1-234.

Gray, Jim, "The Benchmark Handbook for Database and Transaction Processing Systems," Second Edition, Morgan Kaufmann Publishers, Inc., San Mateo, CA. (1993), pp. 1-586.

Agha, Gul A., "ACTORS: A Model of Concurrent Computation in Distributed Systems", Cambridge, CA: *MIT Press*, (1988).

Ackermam William B., et al., "VAL-A Value -Oritented Algorithmic Language: Preliminary Reference Manual," MIT Laboratory for Computer Science, Cambridge, MA MIT/LCS/TR-218, (Jun. 1979).

Patterson, David, A., et al., Computer Architecture: A Quantitative Approach, 2ed . . Morgan Kaufmann (1996), Chapters 2, 4 and 5.

Gray et al., *Transaction Processing: Concepts and Techniques*, Morgan Kaufmann Publishers, San Mateo, CA, pp. 5-22, 115-119, 148-149, 159-174, 221-225, 375-440 (1993).

Levitt, Jason, "Measuring Web-Server Capacity", *Information Week* (1997), printed at http://www.spec.org/osg/web96/infoweek on May 15, 2004.

Ousterhout, John, "Why Threads Are a Bad Idea (for most purposes)" Sun Microsystems Laboratories (1995), printed at http://www.softpanorama.org/People/Ousterhout/Threads/ on may 10, 2004.

Standard Performance Evaluation Corporation, "SPECweb96 Release 1.0 " (1997), printed at http://www.spec.org/osg/web96/runrules.html; . . . /web96/webpaper.html; . . . web96/workload.html; . . . /web96/notes.html; . . . /web96/results/res2000ql on May 10, 2004.

US 5,796,654, 08/1998, Hanif et al. (withdrawn)*

* cited by examiner

PRIOR ART FIG. 1

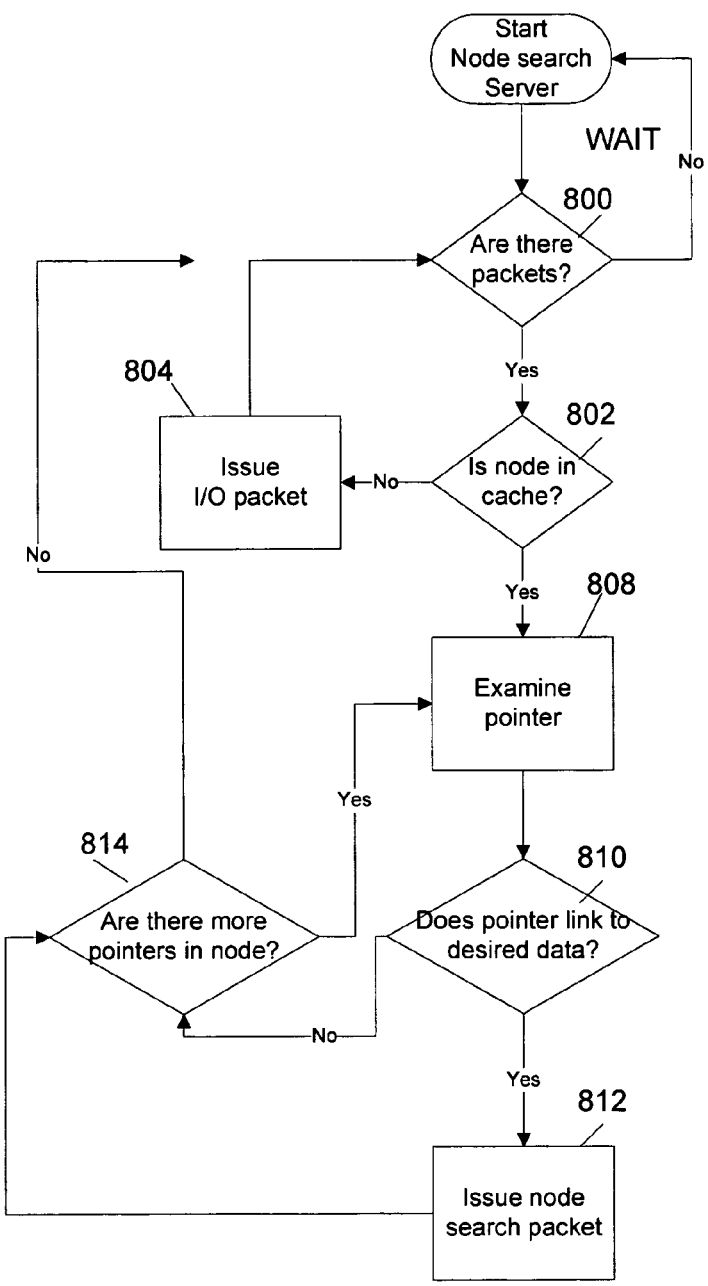
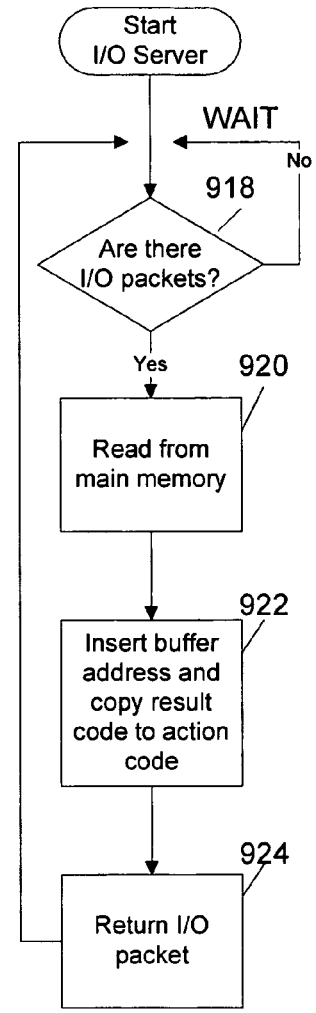
FIG. 9
FIG. 8

METHOD OF PIPELINED PROCESSING OF PROGRAM DATA

TECHNICAL FIELD

The invention relates generally to parallel processing techniques and, more particularly, to a method of pipelined processing of program data.

BACKGROUND OF THE INVENTION

In the past few years, the speed and performance of microprocessors has improved dramatically. Unfortunately, the speed of computer memory has not kept pace with these improvements. Thus, it is often the case that a computer program executes at the full speed of the microprocessor, only to be slowed down by frequent reads from memory.

The use of cache memory has ameliorated this situation somewhat. Computer systems generally keep a copy of the most recently accessed data in cache under the assumption that a program will tend to make multiple accesses to the same block of data over a short period. Thus, by storing a copy of the most recently read block of memory in cache, the system increases the chance that subsequent blocks of data required by the program will be located in cache. Since access to cache tends to be much faster than access to main memory or disk, it is preferable to have as much data as possible in cache.

When searching for data, most computer systems will attempt to locate the data in cache first. If the data is not located in cache, then a "cache miss" is said to have occurred, and the computer system will then be forced to read the data from slower "main memory."

Simply using cache memory to store the most recently used data of an executing program was previously adequate to mask the disparity between processor speeds and main memory speeds. However, on heavily loaded systems that service multiple clients, this solution is insufficient, due to the fact that using the conventional programming model, a single thread of execution is used to perform an entire task which may include many unrelated subtasks from start to finish. Each thread tends to run on its own Central Processing Unit (CPU) and monopolize the cache of that CPU. The result of this setup is that each user thread tends to optimize the caching of its user-specific data, while competing for global data with other user threads in an inefficient, cache-destructive manner.

To illustrate the conventional method of cache utilization, reference is made to the database index tree 190 of prior art FIG. 1 and the flowchart of prior art FIG. 2. The index tree 190 contains a set of nodes 100–132, each of which represents an alphabetical range in a database. The nodes 100–132 contain pointer 134–180. The pointer 134–164 contained in the nodes 102–116 point to other nodes, while the bottom row of nodes 118–132 contain pointers to parts of a desired data block 195. For example, the node 100 contains pointers 134 and 136, which point to the nodes 102 and 104 respectively. Additionally, the bottom row of nodes 118–132 are horizontally linked, although the linking pointers are not depicted.

The flow chart of FIG. 2 illustrates how the index tree 190 is searched using a program developed according to the conventional model. It is assumed that the desired data block 195 contains database entries starting with the letters F through Q, and that a conventional program is required to traverse the index tree until the nodes 122–130 nodes have been located and evaluated. It is also assumed that each of the pointers 134–164 contains a descriptor indicating the alphabetic range to which it links. Finally, it is assumed that none of the nodes of the index tree 190 are initially located in cache.

At steps 200 and 202, the conventional program attempts to locate the node 100. Since the node 100 is not located in cache the conventional program reads the node 100 from main memory at step 204. At steps 206–209, the conventional program searches the node 100. At step 208 the conventional program determines that the pointer 134 links to a block of data having the range A–K, which includes part of the desired data block 195. At step 210, the conventional program determines that the node 100 is not on the bottom row. The conventional program then attempts to locate the node 102 back at step 200. Since the node 102 is not in cache, the conventional program reads the node 102 from main memory at step 204. The flow then proceeds to steps 206–209 in which the conventional program examines the pointer 142 of the node 102 to determine whether it links to the desired data block. The pointer 142 of the node 102 links to the range A–E, which does not include any part of the desired data block 195. Thus, the conventional program will then repeat steps 206–209 to examine the pointer 144. Since the pointer 144 links to the range F–K and the bottom row has not been reached the flow passes through step 210 and returns to step 200.

Upon return, the conventional program attempts to locate the node 112 at steps 200 and 202. Since the node 112 is not in cache the flow of control proceeds to step 204 in which the conventional program reads the node 112 from main memory. After the node 112 is read into cache, the conventional program examines the pointer 158 of the node 112 at steps 206–209. The pointer 158 links to the range F–G, which includes the desired data block 195. At step 210, the conventional program determines that the bottom row has not been reached, and thus the conventional program returns to step 200. At step 200 the conventional program attempts to locate the node 122. Since the node 122 is not located in cache the flow proceeds to step 204 in which the conventional program reads the node 122 from main memory. Once the node 122 is read into cache the flow proceeds to steps 206–209 in which the conventional program examines the pointer 170. Since the pointer 170 points to the beginning of the desired data block 195 the flow of control moves to step 210. At step 210, the conventional program determines that node 122 is on the bottom row due to the fact that it contains a pointer to the desired data block. The conventional program then proceeds to step 211, in which it determines whether there are any more nodes in the bottom row. If there are no more, then the conventional program terminates. If there are more nodes, then the conventional program attempts to locate the next node in the bottom row, node 124. Since node 124 is not in cache, the conventional program reads node 124 from main memory. This process repeats until nodes 126, 128, and 130 are all read into memory and examined. At that point the conventional program has located all of the nodes required to access the desired data block, and the procedure ends.

As can be seen, searching an index tree such as the index tree 190 using the conventional programming model requires a single thread to alternate between reading a node from main memory and examining the node, resulting in a single search path through the index tree. One problem with this approach is that it discourages parallelism. If, for example, the nodes 104 and 108 had been located in cache, then the conventionally programmed search illustrated above would still have proceeded along the nodes 100, 102, 112, and 122 even though searching along the nodes 100, 104, 108 and 130 would clearly have been more efficient. It can therefore be seen that a need exists for a method of parallel programming that more effectively uses cache.

Another problem is that in a multiprocessing system, multiple users will tend to compete for resources when attempting to perform similar tasks. Prior art FIG. 3 shows an example of how two users performing simultaneous searches of a database index tree on a multiprocessor system can inadvertently compete for resources. As shown, the thread for user A executes on the CPU 301, while the thread for user B executes on the CPU 302. As in the previous example, each thread requires its CPU to alternate between reading a node and examining the node. While the user context information for each thread, (such as such as user-id and the program call stack) tends to remain in each of the respective caches 306 and 308, the global context information required to perform the two distinct tasks ("examine node" and "perform I/O") must be read from the main memory 304 frequently in order to keep the caches 306 and 308 coherent with main memory 304 and with each other. It can thus be seen that there is a need for a method of programming in a multiprocessor system that prevents multiple users from competing with one another for global resources.

SUMMARY OF THE INVENTION

In accordance with these needs, the present invention is realized as a method of pipelined processing. According to the method, a computer program is organized into "servers." Each server defines one or more computer-executable functions for performing a particular task in the overall program. For example, a database program could be organized into servers for buffer management, scanning index pages, scanning data pages, logging, I/O, sorting, updates, and locks.

A server generally runs as an event loop which remains in a wait state until a "work packet" or pointer thereto is received in the server's queue. A work packet is a user-defined data structure for holding data needed to perform that task. Pending work packets remain in the server's queue until they are ready to be processed by the server. A server executes until it has processed the pending work packets, at which time reverts to a wait state. Each server is capable of performing its designated task for any user on the computer system.

When a pipeline program is executed on a multiprocessor system, each CPU will seek out a server having a pending work packet. No two CPU's will be permitted to process a single server's workload unless they can do so without conflict. Thus, the general effect of this scheme will be that each CPU will tend to perform a single task for all users, thereby insuring that the global context state for each task tends to remain in the cache of the CPU performing that task. The user state information is passed from server to server within the work packets.

BRIEF DESCRIPTION OF THE DRAWINGS

PRIOR ART

PRIOR ART

PRIOR ART

FIG. 8 is a flowchart generally depicting the steps taken by an exemplary node search server in accordance with the present invention;

FIG. 9 is a flowchart generally depicting the steps taken by an exemplary I/O server in accordance with the present invention;

DETAILED DESCRIPTION OF THE INVENTION

Figure 1:
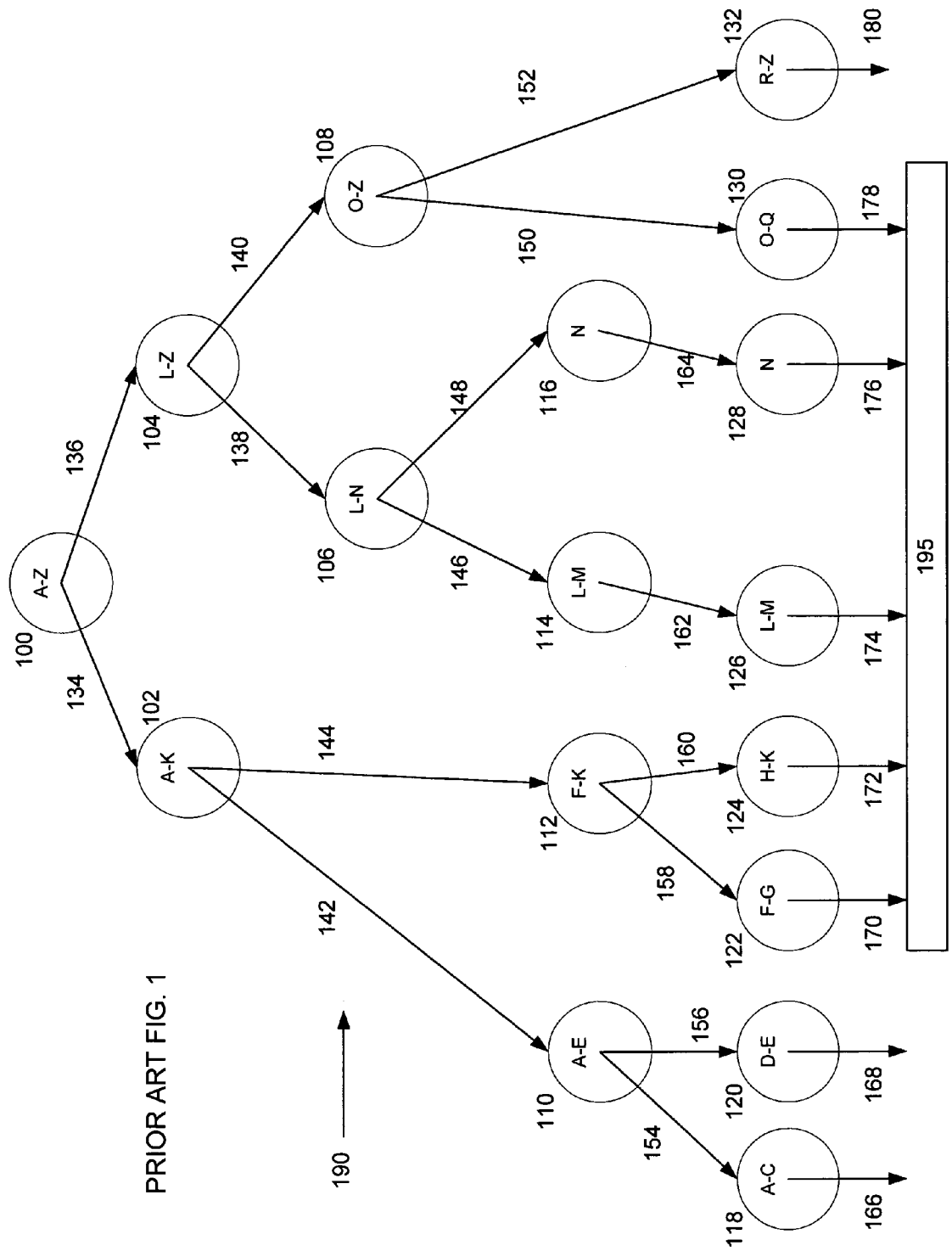
FIG. 1 is a flow diagram of a conventional index tree.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with many computer system configurations, including multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 4:
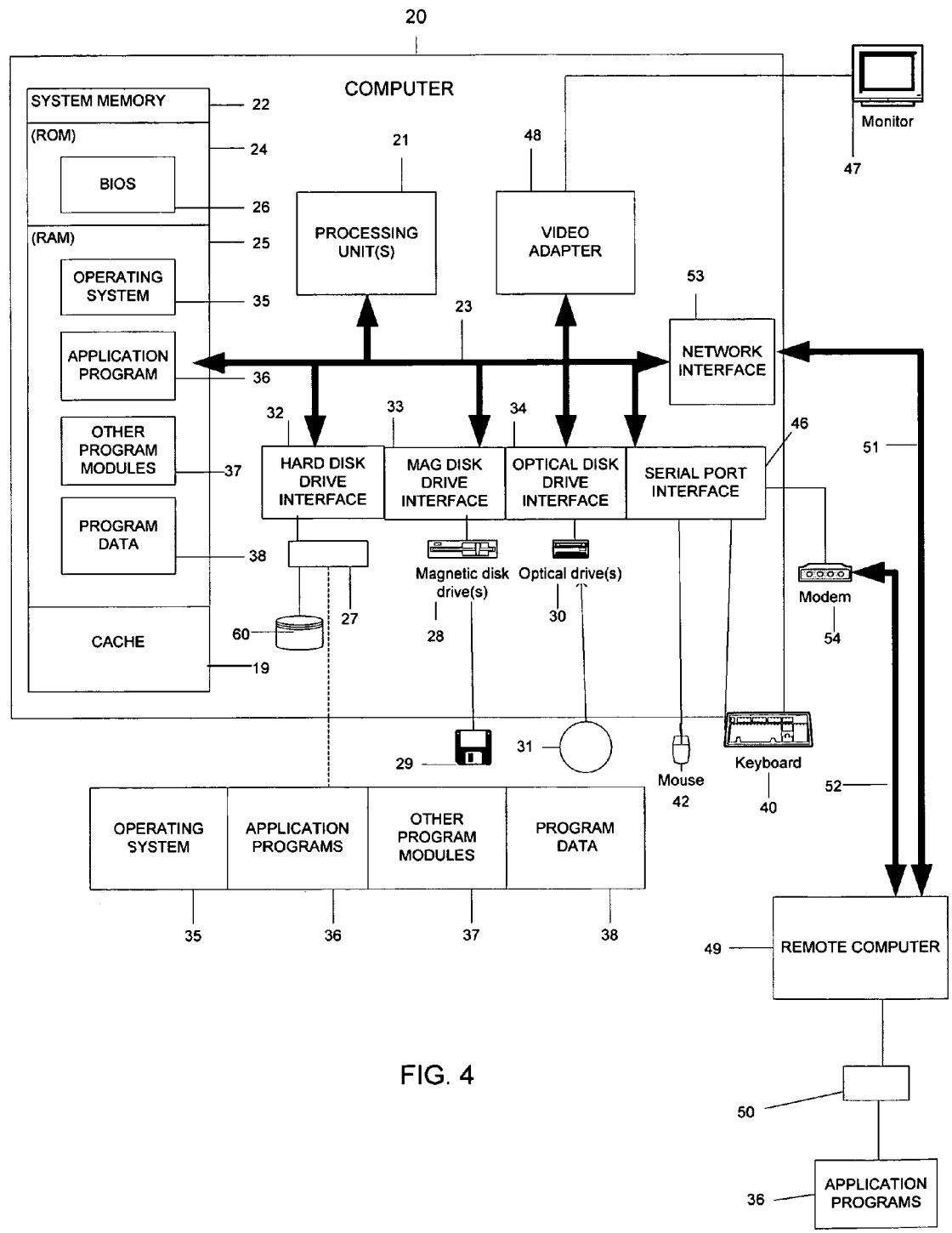
FIG. 4 is a block diagram illustrating an exemplary LAN or WAN computer system on which the present invention can reside.

With reference to FIG. 4, an exemplary system for implementing the invention includes a general purpose computing device in the form of a conventional computer 20, including one or more central processing units or CPUs 21 processing, a system memory 22, and a system bus 23 that couples various system components including the system memory to the CPUs 21. The system bus 23 may be any of several types of bus structures including a memory bus or memory controller, a peripheral bus, and a local bus using any of a variety of bus architectures. The system memory includes read only memory (ROM) 24 random access memory (RAM) 25 and a cache 19. The cache 19 may be shared among several of the CPUs 21. Additionally, each CPU 21 may have its own dedicated cache (not shown). A basic input/output system (BIOS) 26, containing the basic routines that help to transfer information between elements within the computer 20, such as during start-up, is stored in the ROM 24. The computer 20 may include one or more hard disk drives 27 for reading from and writing to one or more hard disks 60, one or more magnetic disk drives 28 for reading from or writing to one or more removable magnetic disks 29, and one or more optical disk drives 30 for reading from or writing to one or more removable optical disks 31 such as a CD ROM or other optical media.

The hard disk drives 27, magnetic disk drives 28, and optical disk drives 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs hard disks 60, removable magnetic disks 29, and removable optical disks 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disks 60, magnetic disks 29, optical disks 31, ROM 24, RAM 25, or cache 19 including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, universal serial bus (USB), or dedicated controller. A monitor 47 or other type of display device is also connected to the system bus 23 via an interface, such as a video adapter 48. In addition to the monitor, computers typically include other peripheral output devices, not shown, such as speakers and printers.

The computer 20 may operate in a networked environment using logical connections to one or more remote computers, such as a remote computer 49. The remote computer 49 may be another computer, a server, a router, a network PC, a peer device or other common network node, and typically includes many or all of the elements described above relative to the computer 20, although only a memory storage device 50 has been illustrated in FIG. 4.

The logical connections depicted in FIG. 4 include a local area network (LAN) 51 and a wide area network (WAN) 52. Such networking environments are commonplace in offices, enterprise-wide computer networks, intranets and the Internet. It will be appreciated that the network connections shown are exemplary and other means of establishing a communications link between the computers may be used. When used in a LAN networking environment, the computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the computer 20, or portions thereof, may be stored in the remote memory storage device 50.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As previously described, the conventional method of constructing a program to carry out a task on a computer forces each user thread to use a single CPU to seek out the functions and data required for a sub-task, perform the sub-task, seek out another set of functions and data for the next sub-task, and so on. While serially executing program tasks in this manner helps insure that the context data for the user remains in the cache for that CPU, it ignores the negative effects of swapping the global context data (the functions and data common to all user threads) required for each sub-task in and out of cache.

Figure 5:
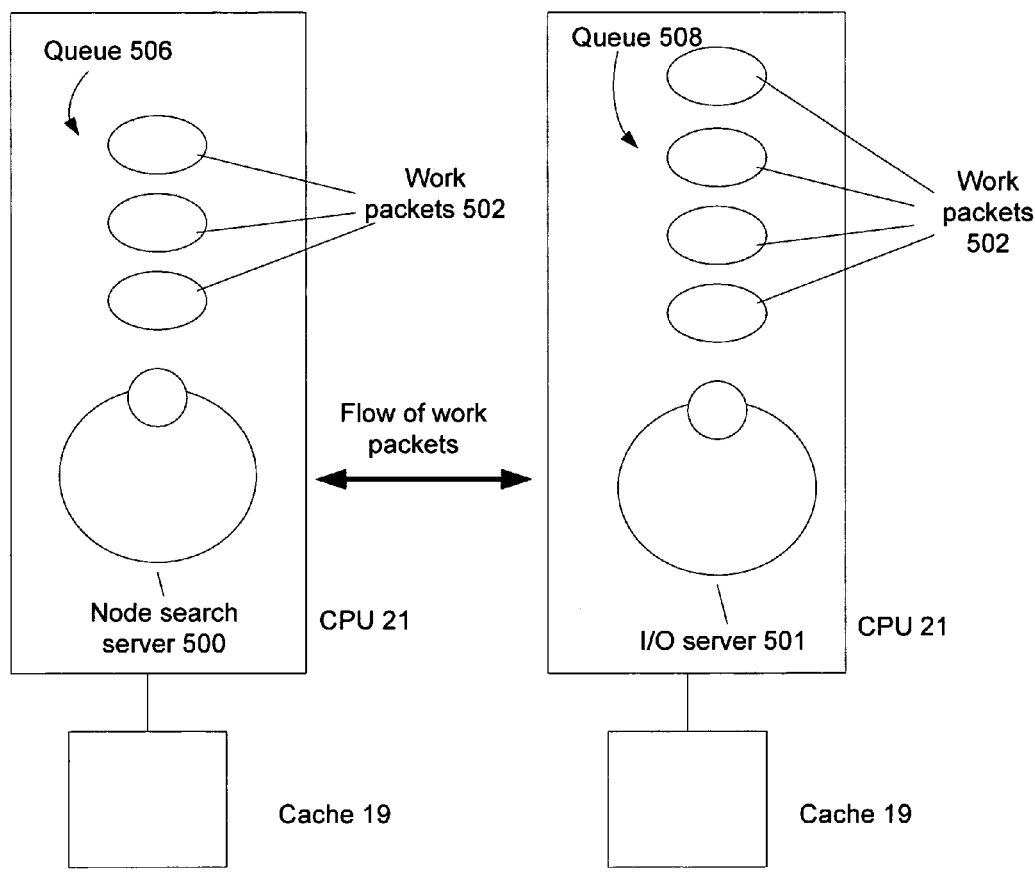
FIG. 5 is a block diagram generally illustrating an exemplary architecture that may be used for programming in accordance with the present invention.

The invention is generally realized as a method of pipelined processing of computer program data. In accordance with the method, a computer program is divided into a series of event loops or servers, as shown in FIG. 5, in which each server performs a task of the overall program. To invoke a server, a caller passes a pointer to a queue associated with the server. The pointer references a data structure hereinafter referred to as a "work packet." The work packet contains the information required by the server to perform its particular task, including the user context data and an action code, if required. Each work packet may be structured so that it is suited for use by a particular server. Once a pointer to a work packet is passed to a server from another server, or from a main program, the functions defined in the server are performed upon the data contained in the work packet, and the results of the operations are be stored within the work packet, in a separate buffer, or other location defined by the programmer.

In the example of FIG. 5, a program designed to search the index tree 190 of prior art FIG. 1 is programmed as two servers: a node search server 500 for searching individual nodes and an Input/Output (I/O) server 501 for retrieving nodes of the index tree 190 from main memory. As each of the servers is repeatedly executed, one or more work packets 502 may be stored in queues 506 and 508 associated with the servers 500 and 501 respectively. A work packet for the node search server 500 is a data structure that may include the logical address of the node (database page number), the memory address of the buffer containing that node (if the node is in memory), a pointer to the search criteria and a pointer to a "parent" packet which request this search. An I/O work packet may contain the database page number, the memory address of buffer containing that database page after the read, an opcode (read or write) and a pointer to the parent packet (which, in this example would be one of the node search work packets) which requested the IO.

Furthermore, each server is sized so that its code and associated data structures fit into the cache 19 of each CPU 21. Although only two CPUs and caches are shown, it is understood that any number of caches and CPUs may be used for executing the two servers. To maximize the use of cache, it is preferred that each server of a pipelined program be executed on only one CPU at a time. Maintaining a one-to-one correspondence between the CPUs 21 and the servers 500 ensures cache locality and maintains cache coherency among the CPUs 21 as well as with the main memory. However, there may be some types of servers that can run on two or more CPUs at once without any risk of cache contention. To distinguish between servers that need exclusive use of a CPU and those which don't, it is preferred that each server contain a flag or other data structure which designates the sever to be shared, exclusive, or partitioned. A shared server may run on more than one CPU at a time. An exclusive server, in contrast, may only be executed on a single CPU. Multiple CPUs may process the work packets of a partitioned server only if a data field in each of the work packets falls within a predetermined range of values. For example, the I/O server 501 could be partitioned in half by database page number. One instance of the I/O server 501 running on one CPU might only process those work packets whose "destination address" fields corresponded to low memory, while another instance of the I/O server 501 running on a second CPU might only process work packets for reads to high memory. A server may receive a work packet from another server, a main program, or other calling entity. Additionally, a server may "invoke" itself by placing a work packet in its own queue. This can be done in response to some predefined event or condition, for example.

Figure 6:
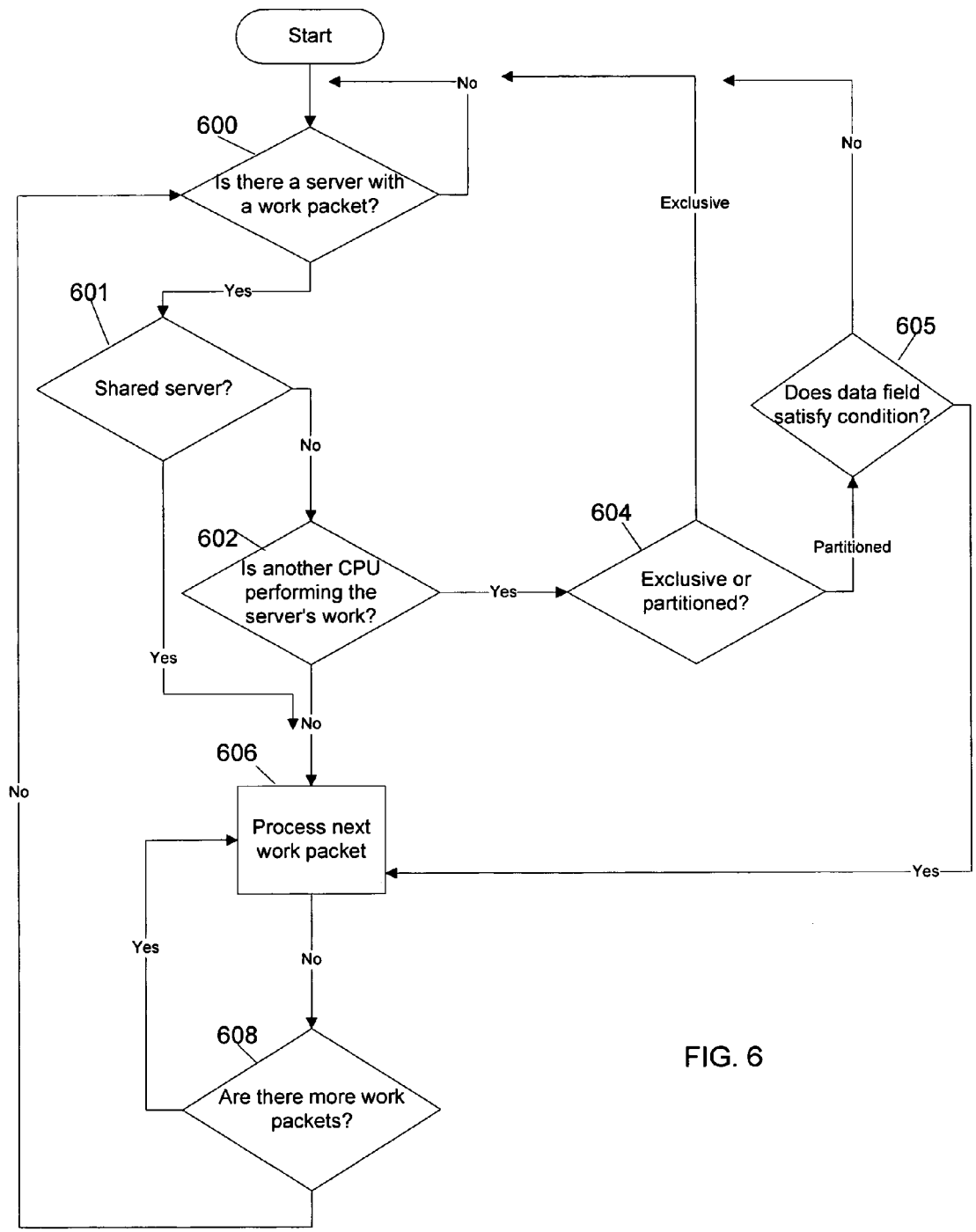
FIG. 6 is a flowchart generally depicting the steps for seeking out and executing the workload of a server in accordance with the present invention.

When a pipelined program runs on a computer system, each CPU may seek out and perform the work of the servers in a manner generally depicted in the flowchart of FIG. 6. As shown, a CPU waits at step 600 until at least one of the servers has at least one work packet in its queue. At step 601, the CPU determines whether the server is shared by examining a flag. If the server is shared, then the flow of control will continue at step 606. If the server is not a shared server, then the CPU determines whether another instance of the server is already running on another CPU at step 602. If no other CPU is currently processing the server's queue, then the flow will proceed to step 606. If another CPU is processing the server's queue, the CPU will determine whether the server is exclusive or partitioned by examining the server's flag.

If the server is exclusive, then the CPU searches for another server at step 600. If the server is partitioned, then the CPU reads a value of the first available work packet of the server and determines whether the value satisfies the condition for which a multiple instance of the server may be run (i.e. the partitioning condition). If the condition is not satisfied, the CPU searches for another server having processed work packets in its associated queue at step 600. If the partitioning condition is satisfied for a work packet, the flow continues at step 606. At steps 606–608, the CPU performs the operations on each work packet in the server's queue until the queue is empty. The CPU then waits for another server to receive a work packet at step 600. The steps of FIG. 6 can be rearranged and modified in many ways. For example, if the CPU finds that a work packet does not satisfy the required conditions for being processed on a partitioned server, the CPU may check other packets in the queue before attempting to locate another server.

Figure 7:
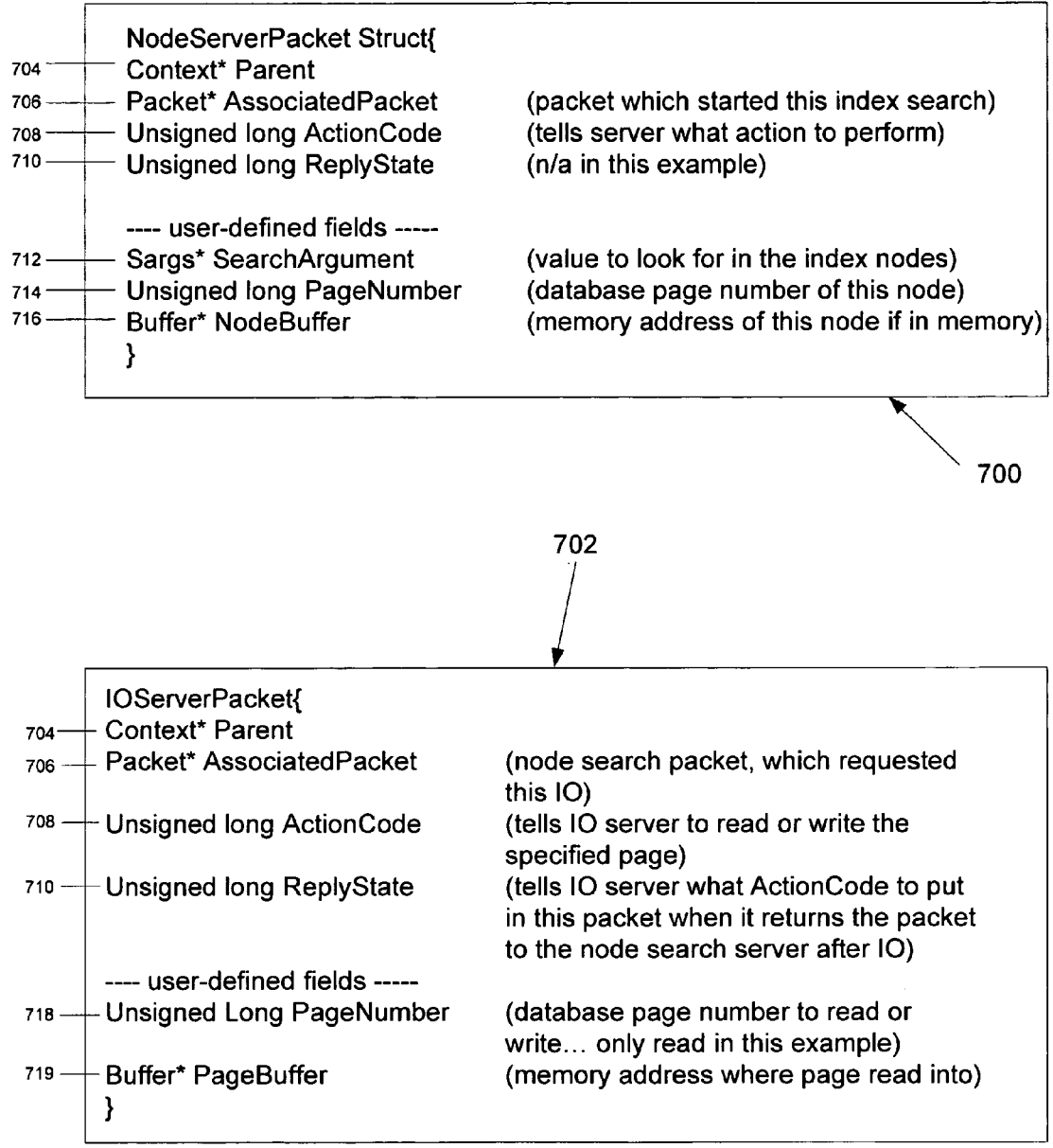
FIG. 7 is a partial code listing of exemplary data structures which may be used to implement a packet in accordance with the present invention.

To create a pipelined program for searching the index tree 190 of Prior art FIG. 1, the data structures of FIG. 7 may be used. The exemplary node search work packet data structure 700 and I/O server work packet 702 each inherit user context information from the structure labeled "context." The user context data may include the location of a buffer to receive the results of the search, a network address to send the results to, a user ID to check access rights, and a pointer to the packet containing the original query that initiated this index tree search. A pointer 706 references the parent packet while an action code 708 tells the server whether a special function is to be performed. Such action codes may include: (1) "StartingUpSearch" to initiate an initialization procedure; (2) "StartofBatch" to cause the server to prepare for a new batch of work packets; (3) "EndofBatch" to close out processing of a batch of work packets; and (4) "ShuttingdownServer" to cause the server to exit. This list is meant to be exemplary only and there are many other specialized functions possible.

A reply state pointer 710 may be used to indicate to the processing server what action to take, if any, after the packet has been processed. Example actions include "WaitforChildren" in which the processing server is required to wait for the completion of a child work packet it created, and "WaitforEvent," which causes the server to wait for a predefined event to occur before taking any action. Additionally, the reply state may simply tell the server to generate a "Complete" signal once it has processed a work packet.

A set of user-defined fields for the node search work packet data structure 700 may include a pointer 712 to a value or range of values for which to search in the index tree nodes. For example, the pointer 712 might point to the search parameter "P–Q", indicating a search for nodes having pointers to data starting with letters between P and Q. Another user-defined field 714 might contain the number of the database page containing the node being searched. Finally, if the node being searched is in cache memory, a pointer 716 might contain the address of the page containing the node. In the I/O server packet definition 702, the user defined fields may include variables 718 and 719 for holding the database page number and memory address to which to write or from which to read.

To illustrate how a packet is processed, reference is made to FIG. 5. The node search server 500 processes node search work packets contained in its queue 506. Each node search work packet has the data structure of 700 in FIG. 7. In this example, the node search server is not required to do anything special after it consumes a node search work packet, so the reply state pointers 710 of the node search work packets may contain a value of null. To process a node search work packet, the node search server 500 first determines whether a particular node is in cache memory by performing a hash-lookup on the page number. If the page number is not found then the node search server 500 obtains an empty I/O work packet (having the data structure of 702, FIG. 7), links it to the node search work packet and sends the empty I/O work packet to the I/O server 501 as a child. The I/O work packet will have a reply state of "Complete," thus telling the I/O server to place a "complete" code in the action field of the processed I/O packet. This allows the node search server 500 to distinguish between a node search packet and a processed I/O packet. The I/O server 501 then issues an I/O request to read the specified page into cache memory and "waits" for that I/O to complete before sending the I/O packet back to the node search server. While waiting for the I/O to complete, the I/O server 501 continues to process other work packets from its queue. When the I/O completes, the I/O server 501 assigns the address of the recently read-in page (containing the node required by the node search server) to the buffer pointer 719 and returns the I/O work packet to the sender (i.e. the node search server 500). The node search server 500 copies the buffer address to the buffer pointer 716 of the node search packet (the parent of the I/O packet) and frees the IO packet for reuse. The processing of the of the node search packet continues with the node search server 500 searching the node located at the buffer address referred to by the pointer 719.

Figure 10:
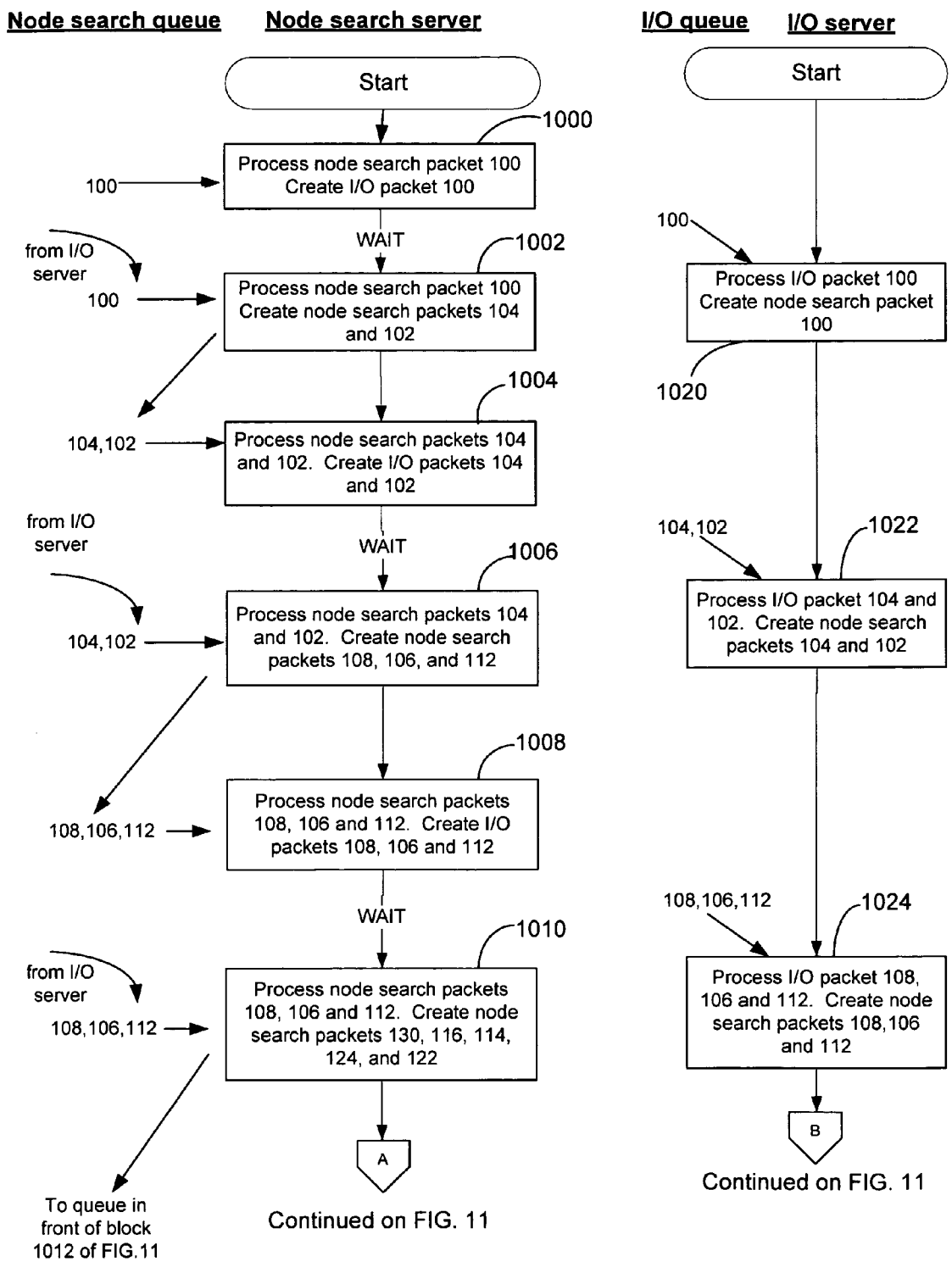
FIGS. 10–11 are a flow diagram generally depicting an exemplary movement of work packets resulting from a search of an index tree in accordance with the present invention; and PRIOR ART

An example of how the exemplary search program of FIG. 5 may search the index tree 190 of prior art FIG. 1 is generally depicted in the flow charts of FIGS. 8, 9 and 10. The steps of the node search server 500 are illustrated in FIG. 8, while those of the I/O server 501 are illustrated in FIG. 9. Although the following description will refer back and forth to the flowcharts of FIGS. 9 and 10, it will be understood that the two servers 500 and 501 can perform their respective tasks in parallel and simultaneously on two separate CPUs except when otherwise noted.

Figure 2:
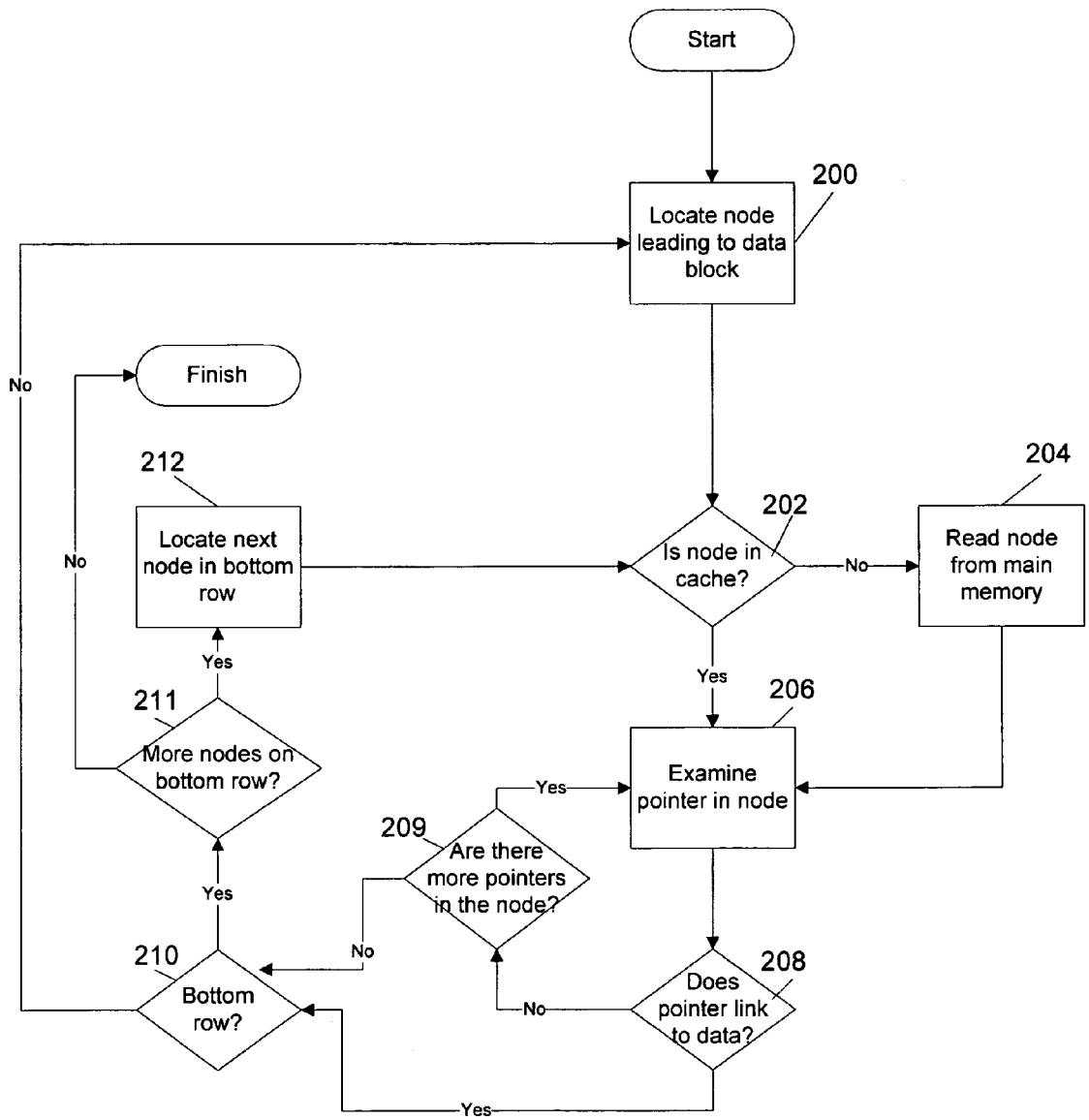
FIG. 2 is a flowchart generally depicting the steps for searching an index tree using a conventional programming technique.
Figure 3:
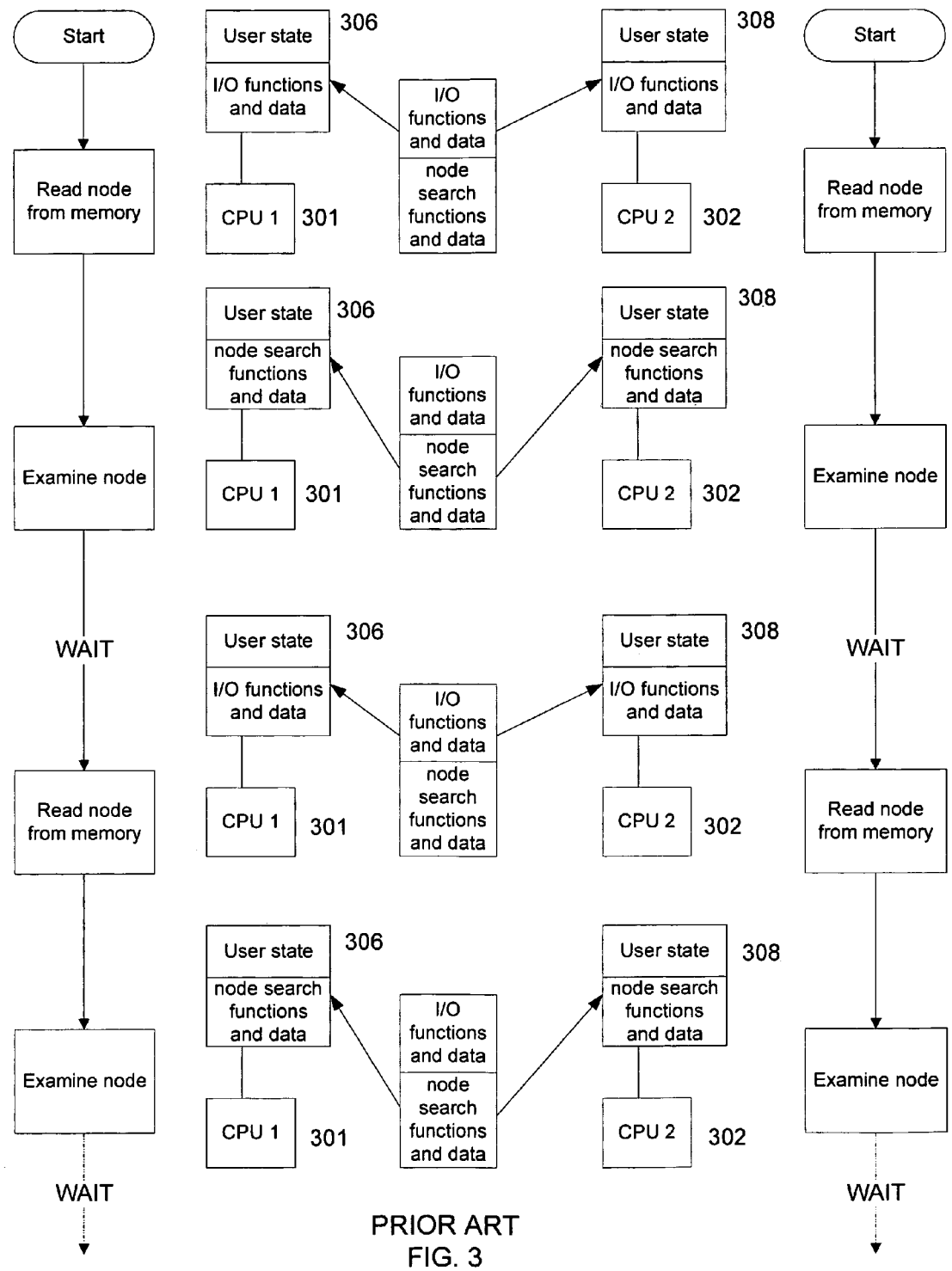
FIG. 3 is a block diagram generally depicting the flow of data in a conventionally programmed search of an index tree.
Figure 11:
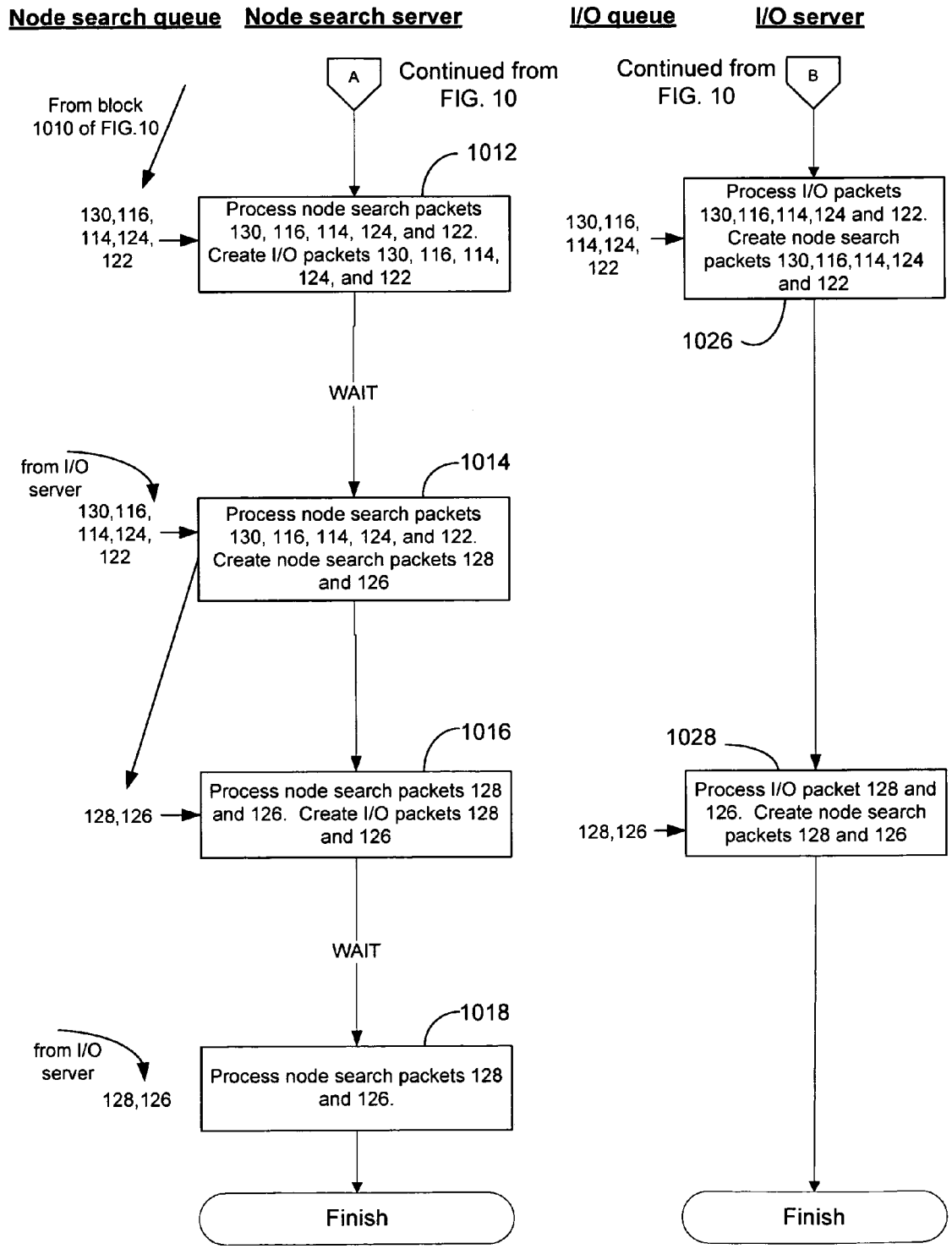

Referring to FIGS. 10–11, a flow diagram generally describing the overall movement and processing of packets by the two servers is shown. In this example, it is assumed that a caller has already placed a work packet to search the index tree in the node search server queue 506, while the queue 508 of the I/O server 501 is initially empty. It is also assumed that none of the nodes of the index tree 190 is in cache initially. Finally, it is assumed that the goal of the program is identical to the goal of the prior art program depicted in prior art FIG. 2, which is to read the desired data block 195, representing database entries within the range F–Q.

At step 800 the node search server determines that there is a node search work packet in the queue. This first packet might have the action code "StartingupServer" or "Startof-Batch" which would tell the node search server 500 that the first node (node 100) of the index tree 190 must be searched. The flow of control therefore, proceeds to step 802. At step 802 the node search server determines whether node 100 is in cache. Since the node 1100 is not in cache, the node search server 500 obtains an empty I/O work packet (FIG. 7, data structure 702) and assigns a value of "ReadNode" to the "ActionCode" field and a value of "Complete" to the "ReplyState" parameter. These codes are only meant to illustrate how the "ReplyState" and "ActionCode" fields may be used. Many other code schemes are possible.

As depicted in front of blocks 1000 and 1020 of FIG. 10, the node search packet queue 506 contains a partially completed packet for the node 100, while the I/O packet queue 508 now contains one unprocessed I/O packet for that node as shown at block 1020. Since there are no more unprocessed work packets in the queue 506, and since the node search work packet for node 100 is awaiting I/O, the node search server 500 returns to a wait state.

At step 918, the I/O server 501 determines if there are any outstanding I/O packets. Since there is now an unprocessed I/O work packet for the node 100 (block 1020 of FIG. 10), the I/O server reads node 100 from main memory into cache at step 920 and assigns a value to the pointer 719 (FIG. 7) which corresponds to the cache memory address of the page containing the node 100. At steps 922 the I/O server 502 copies the value contained in the "ReplyState" field to the "ActionCode" field of the I/O packet. The I/O server 502 then returns the processed I/O work packet to the node search server 500 at step 924. The flow then returns to step 918, at which point the I/O server determines that there are no other packets remaining in its queue. The I/O server 501 returns to a wait state.

The node search server 500 at step 800 detects the presence of the I/O packet and determines that the I/O packet has been completed (based on the "Complete" value in the "ActionCode" field) and therefore resumes processing the corresponding node search packet for the node 100 (block 1002 of FIG. 10). The node search server 500 then determines that the node 100 is, in fact, in cache and examines the pointer 134 at step 808. At step 810, the node search server 500 determines that the pointer 134 links to the range A–K. The node search server 500 then issues a node search work packet for the node 102 at step 812. At step 814 the node search server determines that there is another pointer within node 100 examines it at step 808. This second pointer is the pointer 136. At steps 810 and 812, the node search server 500 determines that the pointer 136 links to the range L–Z, which includes part of the desired data block 195, and thus issues an node search packet for the node 104 at step 812. The flow then proceeds to step 814 at which point the node search server determines that there are no more pointers in the node 100. As shown in front of block 1004 of FIG. 10, the node search packet queue now has two packets—one for node 102 and one for node 104—that are awaiting the results of I/O work packets.

At step 800, the node search server 500 determines that there is a work packet (for searching the node 102) awaiting service in the queue 506 (at block 1004). At step 802, the node search server 500 determines that the node 102 is not in cache and thus issues an I/O packet for this node at step 804. Again at steps 800 and 802 the node search server 500 identifies the work packet for the node 104, determines the node is also not in cache and issues an I/O packet for it as well. Since there are no more unserviced work packets in its queue, the node search server 500 reverts to a wait state.

The I/O server 501 then processes the I/O packets at steps 918 through 924 (block 1022 of FIG. 10), by reading the nodes 102 and 104 into cache from main memory, supplying the appropriate buffer locations and "complete" codes and returning the processed I/O packets to the node search server 500. The process then returns to step 800 of the node search server flowchart to begin the process of block 1006 of FIG. 10. At step 800 the node search server 500 determines that there is a completed I/O packet for node 102 that processing for the node 102 search packet can resume. At step 802, node search server 500 determines that node 102 is in cache and therefore, proceeds to step 808. At step 808 the node search server retrieves the first pointer from node 102 which is the pointer 142. Since the pointer 142 links to the range A–E, the node search server does not issue an node search packet for the node 110, but rather examines the next pointer at step 808. At step 808 the node search server examines the pointer 112 and determines that it links to F–K, which is in the range of the desired data block 195. The node search server therefore issues an node search packet for the node 112 at step 812. Since this is the last pointer in node 102, the flow then returns to step 800.

At step 800, node search server 500 detects the completed I/O packet for the node 104 and resumes processing the corresponding node search packet. Since the node 104 is now in cache the flow of control proceeds to step 808. At step 808, the node search server examines the first pointer in the node 104, which is the pointer 138. Since the pointer 138 links to the range L–N, which includes the desired data block 195, the node search server 500 will issue an node search packet for the node 106 at step 812. The flow will then return to step 808. At step 808 the node search server 500 examines the next pointer in the node 104 which is the pointer 140. At step 810 the node search server 500 determines that the pointer 140 links to the range O–Z and therefore will issue a node search packet for the node 108 at step 812. Since there are no more pointers in the node 104 the flow will proceed to step 800, at which point the node search server 500 determines that there are no more unserviced packets and enters a wait state. As can be seen in front of block 1008 of FIG. 10, there are now three nodes search work packets waiting for the results of I/O work packets for nodes 108, 106, and 112.

The I/O server 501 will execute steps 918 through 924 in order to read the nodes 108, 106, and 112 into cache and return the processed I/O packets to the node search server (block 1024 of FIG. 10). The node search server 500 will then examine the nodes 108, 106, and 112 in steps 800 through 814 (block 1010 of FIG. 10), and create node search packets for nodes 130, 116, 114, 124 and 122. At this point, the state of the node search queue is shown at block 1012 of FIG. 11. Five I/O packets for these nodes will then be created by the node search server 500, processed by the I/O server 501 (block 1026 of FIG. 11), and returned to the node search server 500 according to steps 918 through 924 of FIG. 9. The node search server 500 will then search the five nodes according to FIG. 8 and block 1014 of FIG. 11. These five nodes include several of the nodes from the bottom row of the index tree 190. The process will continue through blocks 1016, 1018 and 1028. After nodes 128 and 136 are read from memory and searched, the overall procedure of searching the index tree 190 will be complete.

Figure 12:
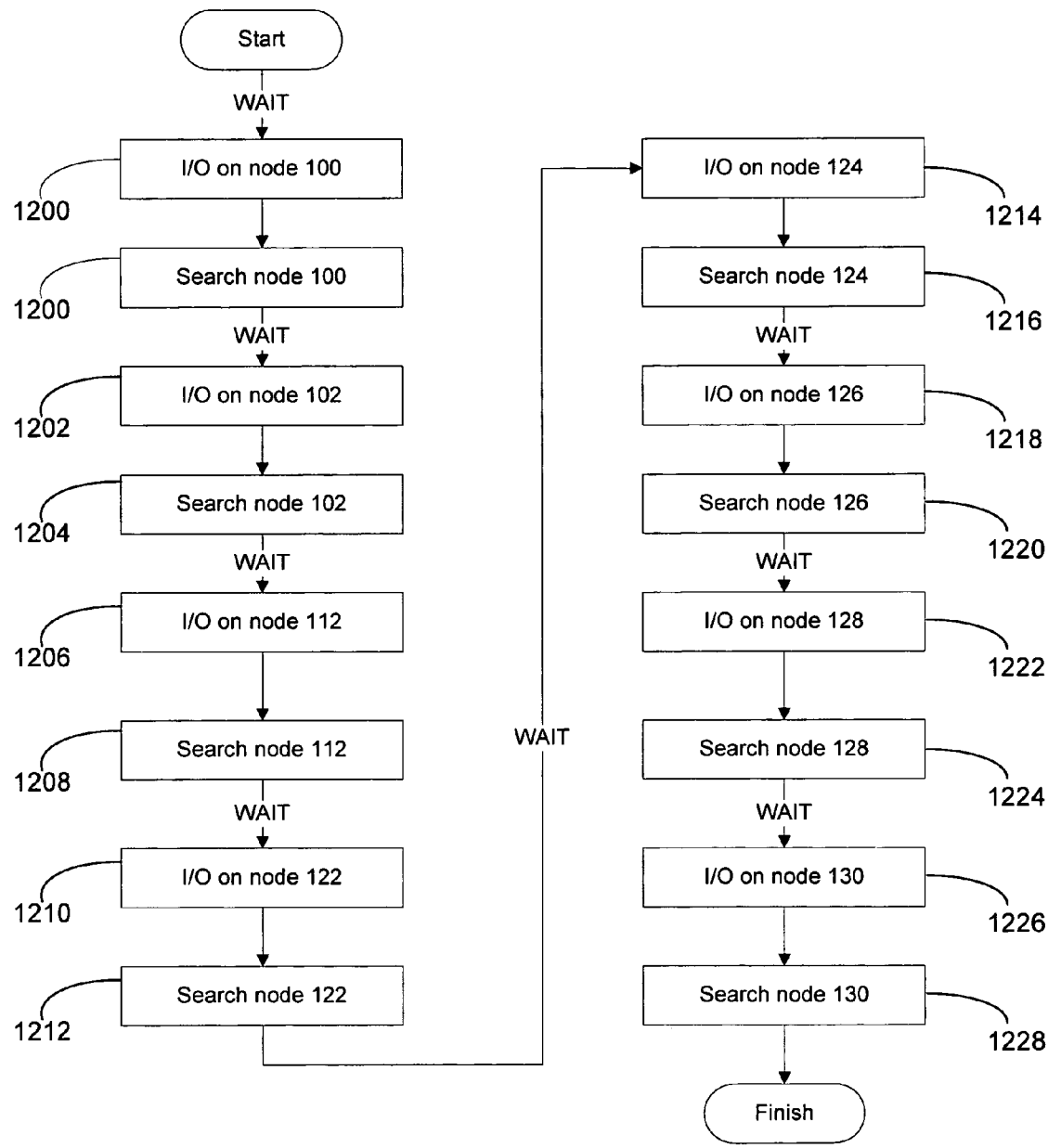
FIG. 12 is a flowchart generally depicting the overall path taken in a conventionally programmed search of an index tree.

As can be seen from FIGS. 10 and 11, traversing the index tree 190 using a node search server and an I/O server causes the node search server to wait for reads from main memory on five occasions. In order to compare this result with the conventional method of prior art FIG. 2, the overall flow of the conventional search is depicted in FIG. 12. As can be seen, the conventional method results in eight waits. Additionally, having I/O requests processed in groups allows for more efficient read operations. For example, if the I/O operations initiated by several I/O packets are to different physical disks or to a disk array, the resulting reads may be performed simultaneously. Even if the reads are only to a single disk, a smart controller process the requests in such a way as the minimize head movement. In contrast, the conventional method can only read from one disk at a time, even though the data may be residing on several independent disks.

Furthermore, parallelism is a natural consequence of the pipelined method of programming. As discussed above in conjunction with prior art FIG. 2, the conventional method of searching the index tree 190 may not take the most efficient path to the desired data block. If nodes 104 and 108 had been located in cache, for example, the conventional method would not have taken advantage of a quicker path through these nodes. The pipelined method, in contrast, would have utilized this path, in parallel with the other paths down the index tree 190.

In view of the many possible embodiments to which the principals of this invention may be applied, it should be recognized that the embodiment described herein with respect to the drawing figures is meant to be illustrative only and should not be taken as limiting the scope of the invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for carrying out a procedure on a computer system having a memory, the memory containing user context data and global data, comprising: executing a first server, wherein the first server comprises a computer-executable function for performing a first sub-task of the procedure; carrying out the first sub-task including manipulating the global data; sending the user context data to a second server; executing the second server, wherein the second server comprises a computer-executable function for performing a second sub-task of the procedure; and carrying out the second sub-task including manipulating the global data and using the user context data, wherein the first and second servers execute with the user context data and the global data stored in a cache such that, for each server, global data in the cache is given priority over user context data in the cache.

2. The method of claim 1, further comprising storing the user context data in a work packet and sending the work packet from the first server to the second server, wherein the work packet contains an action code for describing an action to be performed by the second server.

3. The method of claim 2, wherein the work packet contains a reply state, and the method further comprises: causing the second server to update the work packet by replacing a value contained in the action code with a value contained in the reply state; and causing the second server to send the updated work packet back to the first server.

4. The method of claim 1, further comprising: in response to receiving at the first server a first work-packet containing the user context data, causing the first server to partly perform the first sub-task using the first work packet, sending a second work packet containing the user context data from the first server to the second server, causing the second server to perform the second sub-task using the second work packet and store a result of the second sub-task in the second work packet, and sending the second work packet from the second server to the first server, wherein the result is usable by the first server to complete the performance of the first sub-task.

5. The method of claim 4, where in the second work packet is linked as a child to the first work packet.

6. The method of claim 1, wherein the computer system has a first CPU and a second CPU, and the cache is comprised of a first area usable by the first CPU and a second area usable by the second CPU, and the executable code of the first server is optimized to fit in the first area and the executable code of the second server is optimized to fit in the second area.

7. The method of claim 1, wherein the procedure is a search of a database index tree containing a plurality of nodes that contain node data, the first sub-task is to examine a node and the second sub-task is to perform an input/output operation for retrieving the node from memory and storing the node in the cache.

8. The method of claim 7, further comprising: in response to receiving at the first server a first work packet containing the user context data, causing the first server to determine if a node is in the cache; and if the node is determined not to be in the cache, sending a second work packet containing the user context data from the first server to the second server, causing the second server to retrieve the node from a main memory using the second work packet and store the node in the cache, causing the second server to store a reference to the node in the cache in the second work packet, and sending the second work packet from the second server to the first server, wherein the first server responds to the receipt of the second work packet by searching the node in the cache.

9. The method of claim 8, wherein the first work packet contains a reference to a parent work packet.

10. The method of claim 1, wherein the computer system has a plurality of CPUs, and at least one server executes on only one CPU at a time.

11. The method of claim 1, wherein the computer system has a plurality of CPUs, and at least two instances of one of the servers execute concurrently on different CPUs.

12. The method of claim 1, wherein the computer system has a first CPU and a second CPU, and the work packet has a designated value, and wherein one of the servers executes on the first CPU when the designated value falls within a first range and executes on the second CPU when the designated value falls within a second range.

13. The method of claim 1, wherein additional user context data and global data is not stored in the cache.

14. A computer-readable medium having stored thereon a computer program for carrying out a procedure with two or more sub-tasks on a computer system having a cache, global data and a user context, the computer program comprising: a server for each sub-task, wherein each server comprises a computer executable function for performing its respective sub-task on the global data using the user context and each server executes with the global data and the user context stored in the cache such that, for each server, global data in the cache is given priority over user context data in the cache; and a work packet for transferring the user context between two or more of the servers.

15. The computer-readable medium of claim 14, further comprising an action code located in the work packet for describing an action to be performed by a server.

16. The computer-readable medium of claim 14, further comprising a reply state code for the work packet, the reply state code being usable by a server to gain information about results of a function executed by another server.

17. The computer-readable medium of claim 14, further comprising: a first work packet for a first server; a second work packet for a second server, wherein the first work packet is usable by the first server to perform a first sub-task on the global data and the second work packet is usable by the second server to receive the user context from the first server, perform the second task, and return a result of the second task to the first server.

18. The computer-readable medium of claim 17, wherein the second work, packet is linked as a child to the first work packet.

19. The computer-readable medium of claim 14, wherein the computer system has a first CPU and a second CPU, and the cache is comprised of a first area usable by the first CPU and a second area usable by the second CPU, and the first server is optimized to fit in the first area and the second server is optimized to fit in the second area.

20. The computer-readable medium of claim 14, wherein the procedure is a search of a database index tree containing a plurality of nodes that contain node data, the first sub-task is to examine a node and the second sub-task is to perform an input/output operation for retrieving the node from memory.

21. The computer-readable medium of claim 14, wherein the computer system has a plurality of CPUs, and at least one of the servers is configured execute on only one CPU at a time.

22. The computer-readable medium of claim 14, wherein the computer system has a plurality of CPUs and at least one of the servers is configured to run concurrently as at least two instances on different CPUs.

23. The computer-readable medium of claim 14, wherein the computer system has a first CPU and a second CPU, a designated value field is defined for work packet, and wherein at least one of the servers executes on the first CPU when the designated value falls within a first range and executes on the second CPU when the designated value falls within a second range.

24. A computer-readable medium having stored thereon a data structure, the data structure comprising: a work packet for transferring user context information between at least two servers, wherein each server comprises at least one function for performing a sub-task of a computer-executable procedure to manipulate a global data set using the user context information and each server executes with the user context information and the global data set in a cache such that, for each server, the global data set in the cache is given priority over user context information in the cache.

25. The computer-readable medium of claim 24, wherein the work packet has defined therein an action code for describing an action to be performed by one of the servers.

26. The computer-readable medium of claim 25, wherein the work packet has defined therein a reply state usable by one of the servers to send a result of its sub-task to another server.

27. A computer-readable medium having stored thereon a data structure, the data structure comprising: a first server defining comprising at least one function for performing a sub-task of a computer-executable procedure to manipulate a global data set, wherein the first server executes the function in response to receipt of a first work packet, the first work packet containing user context information usable by the first server to perform the sub-task, wherein the first server transmits the user context information to a second server using a second work packet, and wherein each server executes with the global data set and the user context information in a cache such that, for each server, the global data set in the cache is given priority over user context information in the cache.

28. The computer-readable medium of claim 27, wherein the second server stores a result of a second sub-task performed on the global data set in the second work packet and returns the second work packet to the first server.

29. A computer-readable medium having computer-executable instructions for performing a method, on a computer system having a memory, the memory containing user context-data and global data, the method comprising: executing a first server wherein the first server comprises a computer-executable function for performing a first sub-task of the procedure: carrying out the first sub-task including manipulating the global data: sending the user context data to a second server executing the second server, wherein the second server comprises a computer-executable function for performing a second sub-task of the procedure; and carrying out the second sub-task including manipulating the global data and using the user context data, wherein the first and second servers execute with the user context data and the global data stored in a cache such that, for each server global data in the cache is given priority over user context data in the cache.

30. The computer-readable medium of claim 29 having further computer-executable instruction for: storing the user context data in a work packet and sending the work packet from the first server to the second server, wherein the work packet contains an action code for describing an action to be performed by the second server.

31. The computer-readable medium of claim 30, wherein the work packet contains a reply state, and the computer-readable medium has further computer-executable instructions for causing the second server to update the work packet by replacing a value contained in the action code with a value contained in the reply state; and causing the second server to send the updated work packet back to the first server.

32. The computer-readable medium of claim 29, having further computer-executable instructions for: in response to receiving a first work packet containing the user context-data, causing the first server to partially complete the first sub-task using the first work packet, sending a second work packet containing the user context data from the first server to the second server, causing the second server to perform the second sub-task using the second work packet and store a result of the second sub-task in the second work packet, and sending the second work packet to the first server, wherein the result is usable by the first server to fully complete the first sub-task.

33. The computer-readable medium of claim 29, wherein the computer system has a first, CPU and a second CPU, and the cache is comprised of a first area usable by the first CPU and a second area usable by the second CPU, and the executable code of the first server is optimized to fit in the first area and the executable code of the second server is optimized to fit in the second area.

34. The computer-readable medium of claim 29, wherein the procedure is a search of a database index tree containing a plurality of nodes that contain node data, the first sub-task is to examine a node and the second sub-task is to perform an input/output operation for retrieving the node from memory and storing the node in the cache.

35. The computer-readable medium of claim 34 having further computer-executable instruction for: in response to receiving a first work packet containing the user context data, causing the first sever to determine if a node is in the cache; and if the node is determined not to be in the cache, sending a second work packet containing the user context data from the first server to the second server, causing the second server to retrieve the node from a main memory using the second work packet and store the node in the cache; causing the second server to store a reference to the node in the cache in the second work packet, and sending the second work packet from the second server to the first server, wherein the first server searches the node in the cache.

36. The computer-readable medium of claim 35, wherein the first work packet contains a reference to a parent work packet.

37. The computer-readable medium of claim 29, wherein the computer system has plurality of CPUs, and least one server executes on only one CPU at a time.

38. The computer-readable medium of claim 29, wherein the computer system has a plurality of CPUs, and at least two instances of one of the servers execute concurrently on different CPUs.

39. The computer readable medium of claim 29, wherein the computer system has a first CPU and a second CPU, and the work packet has a designated value, and wherein one of the servers executes on the first CPU when the designated value falls within a first range and executes on the second CPU when the designated value falls within a second range.

* * * * *

UNITED STATES PATENT AND TRADEMARK OFFICE
CERTIFICATE OF CORRECTION

PATENT NO. : 6,973,650 B1
APPLICATION NO. : 09/436618
DATED : December 6, 2005
INVENTOR(S) : Parkes et al.

It is certified that error appears in the above-identified patent and that said Letters Patent is hereby corrected as shown below:

| COLUMN | LINE | ERROR |
|---|---|---|
| 7 | 51-52 | Delete "processed" and insert -- unprocessed --, therefor. |
| 14 | 24 | In claim 27, delete "defining" before "comprising". |

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,973,650 B1
APPLICATION NO. : 09/436618
DATED : December 6, 2005
INVENTOR(S) : Parkes et al.

It is certified that error appears in the above-identified patent and that said Letters Patent is hereby corrected as shown below:

Title Page On page 3, in Item (56), under "Other Publications", in column 1, line 1, delete "Hierarachical" and insert -- Hierarchical --, therefor.

Title Page On page 3, in Item (56), under "Other Publications", in column 1, line 3, delete "Conference:" and insert -- Conference; --, therefor.

Title Page On page 3, in Item (56), under "Other Publications", in column 1, line(s) 17-18, delete "pp317-333" and insert -- pp. 317-333 --, therefor.

Title Page On page 3, in Item (56), under "Other Publications", in column 2, line 3, delete "Value - Oritented" and insert -- Value-Oriented --, therefor.

Title Page On page 3, in Item (56), under "Other Publications", in column 2, line 9, delete "Chapters 2" and insert -- Chapters 3 --, therefor.

In column 7, line(s) 51-52, delete "processed" and insert -- unprocessed --, therefor.

In column 9, line 35, delete "1100" and insert -- 100 --, therefor.

In column 12, line 27, in Claim 4, delete "work-packet" and insert -- work packet --, therefor.

In column 13, line 43, in Claim 18, after "work" delete ",".

In column 13, line 59, in Claim 21, after "configured" insert -- to --.

In column 13, line 67, in Claim 23, after "for" insert -- the --.

In column 14, line 24, in Claim 27, delete "defining" before "comprising".

In column 14, line 27, in Claim 27, after "to" insert -- the --.

In column 14, line 43, in Claim 29, delete "context-data" and insert -- context data --, therefor.

In column 14, line 44, in Claim 29, insert -- , -- before "wherein".

In column 14, line 46, in Claim 29, delete "procedure:" and insert -- procedure; --, therefor.

In column 14, line 47, in Claim 29, delete "data:" and insert -- data; --, therefor.

CERTIFICATE OF CORRECTION (continued)
U.S. Pat. No. 6,973,650 B1

In column 14, line 48, in Claim 29, delete "server" and insert -- server; --, therefor.

In column 14, line 54, in Claim 29, after "server" insert -- , --.

In column 14, line 57, in Claim 30, after "claim 29" insert -- , --.

In column 14, line 58, in Claim 30, delete "instruction" and insert -- instructions --, therefor.

In column 14, line 66, in Claim 31, delete "for" and insert -- for: --, therefor.

In column 15, line(s) 6-7, in Claim 32, delete "context-data" and insert -- context data --, therefor.

In column 15, line 17, in Claim 33, after "first" delete ",".

In column 16, line 17, in Claim 37, after "has" insert -- a --.

In column 16, line 17, in Claim 37, after "and" insert -- at --.

Signed and Sealed this

Sixteenth Day of March, 2010

David J. Kappos
*Director of the United States Patent and Trademark Office*